United States Patent [19]
Ronchetti et al.

[11] Patent Number: 5,862,410
[45] Date of Patent: Jan. 19, 1999

[54] SYSTEM FOR CONTROLLING A VARIABLE SOURCE BY THE FEEDBACK OF THE RUNNING MODE, AND RELEVANT CIRCUIT

[75] Inventors: Luigi Ronchetti, Como; Mario Stroppiana, Turin, both of Italy

[73] Assignee: Alcatel Telettra, Italy

[21] Appl. No.: 989,728

[22] Filed: Dec. 11, 1992

Related U.S. Application Data

[63] Continuation-in-part of Ser. No. 454,277, Dec. 21, 1989, abandoned.

[30] Foreign Application Priority Data

Dec. 21, 1988 [IT] Italy ..................................... 23037/88

[51] Int. Cl.$^6$ ............................. H04N 7/12; H04N 7/26
[52] U.S. Cl. ........................... 395/872; 345/501; 348/405
[58] Field of Search ..................................... 348/390, 404, 348/411, 419, 405; 395/200.61, 200.62, 200.63, 200.64, 888, 889, 872; 345/501, 526

[56] References Cited

U.S. PATENT DOCUMENTS

| | | | |
|---|---|---|---|
| 4,454,546 | 6/1984 | Mori | 358/260 |
| 4,633,312 | 12/1986 | Yasuda | 358/136 |
| 4,672,441 | 6/1987 | Hoelzlwimmer et al. | 348/400 |
| 4,985,766 | 1/1991 | Morrison et al. | 358/135 |
| 5,028,999 | 7/1991 | Vogel | 348/419 |

OTHER PUBLICATIONS

Sayood et al., "Use of ARMA Predictors in the Differential Encoding of Images", IEEE Transactions on Acoustics, Speech & Signal Processing, 1988 pp. 1791–1795.

Zehne et al., "Video Chip Set for Data Rate Compression by Filtering & DPCM Coding", ISCAS, 1988 pp. 697–700.

Lu et al. "Adaptively Controlled Encoding for Interframe DPCM", IEEE 1988 pp. 38.4.1–38.4.5.

*Primary Examiner*—Dinh C. Dung
*Attorney, Agent, or Firm*—Ostrolenk, Faber, Gerb & Soffen, LLP

[57] ABSTRACT

A system for controlling the rate of flow of data generated by a variable rate data source and fed to a buffer which outputs the data at a constant bit rate. The operating mode, which sets the bit rate of the variable rate data source, is determined not only by the degree to which the buffer is filled, but also by the immediately preceding operating mode. The feedback of the operating mode results in an hysteresis effect on the mode, thus reducing the number of changes of the rate of data generation and thereby increasing the transmission quality of the data generated and output from the system.

11 Claims, 20 Drawing Sheets

SYSTEM FOR CONTROLLING A VARIABLE SOURCE BY THE FEEDBACK OF THE RUNNING MODE, AND RELEVANT CIRCUIT

This is a continuation-in-part of application Ser. No. 07/454,277, filed on Dec. 21, 1989 now abandoned.

BACKGROUND OF THE INVENTION

1. Field of the Invention

The present invention relates to a system for controlling the rate of flow of data from a variable data source, that, in conjunction with a buffer, outputs data at a constant rate. The invention also includes the circuitry for implementing such a system.

2. Description of the Related Art

The invention can be included in the field of control systems which take data from a variable rate source and transmit that data at a constant bit rate (where bit rate is a measurement of the quantity of information transmitted during a unit of time). To obtain a constant bit rate at the output when, at the input there is a data source generating data at a variable rate, it is necessary to use a delay memory (i.e. a buffer).

As is well-known, the buffer can be considered to be a recurrent memory, in which the data are read (outputted) serially at a constant frequency fr, but written (inputted) serially at a variable frequency fw (t). To avoid information losses, it is absolutely necessary to ensure that the pointers Pr for reading (increasing uniformly versus time) and the pointers for writing Pw (increasing in a variable manner versus time) do not overtake each other while the system is running, but instead maintain a suitable distance apart from one another. The difference between the writing pointer and the reading pointer represents the filling degree of the buffer (i.e. the buffer status).

A typical prior art control system has the structure shown in FIG. 1. The data Din (15) coming from the variable source S (1) are written in the BUFFER (3) in the locations of memory Pw generated by the written counter Contl (4), at a rate determined by clock Cks (16) (which has a variable frequency); similarly, the output data Dout (17) are read from the BUFFER (3) in the locations of memory Pr generated by the reading counter Contl (4'), working with the clock Ckl (18) (which has a constant frequency). The degree of buffer filling is determined by the difference between the pointers Pw and Pr calculated from the Diff (5). The rate of flow of data generated by the variable data source S is controlled by applying to the source an operating mode signal, output of register RE (7); the lower the operating mode, the greater the information quantity generated by the source (i.e., the higher the data rate) and the better the quality of the transmitted data, and vice versa. The operating mode is applied to the source with a control frequency established by the clock Ckc (19). The period of clock Ckc depends on the nature of the application: in video compression applications, typically, the period of clock Ckc corresponds to a so-called stripe period (8 video lines) or to a so-called macroblock period (1/N of stripe period), in dependence of the type of compression algorithm adopted. The mode signal is then obtained, at the successive time instants $(t_0, t_1, t_2, \ldots t_k, t_{k+1}, t_{k+2}, \ldots)$ defined by the clock Ckc, as a function of the buffer status (buffer filling degree) at those time instants. In other words, the operating mode signal used to control the variable data source S during time instants between $t_k$ (comprised) and $t_{k+1}$ (excluded) has a value that is a function of the buffer filling degree measured at time $t_k$.

Generally, alarm signals ALL (20) (overlapping or overtaking of the pointers), overflow control signals OV (21) (filling about to exceed the buffer dimensions) and underflow control signals UND (22) (filling approaching zero) are also generated to manage anomalous running situations.

Various buffer control strategies are well-known. Some strategies tend to keep the buffer filling constant whenever possible (typically equal to half the buffer dimensions); other strategies tend to obtain a mean bit rate at output, applying modes proportional to the buffer filling degree, using constant memory sectors for each running mode (an example is shown in FIG. 2), establishing in all cases a fixed relation between the buffer status (or filling degree) (abscissa) and the operating mode (ordinate).

The main drawbacks of the well-known techniques are mainly the limited capacity of mediation (cooperation) between source and output due to the assignment of limited buffer areas to each running mode. This causes the transmitted data quality to be excessively variable versus time, since it is closely connected to the activity of the source, thereby leading to a deterioration of the system performance.

It is true that it is possible to reduce these disadvantages by increasing the buffer dimensions, but it is also true that, among other things, the system costs and the round trip delay (the delay between data generation and its use) are increased.

SUMMARY OF THE INVENTION

The first object of the present invention is to provide a system that overcomes the above mentioned drawbacks. Another object of the invention is to provide a simple, compact, flexible circuit with low implementation and operating costs which implements such a system.

These and other objects are obtained using a system of the type mentioned in the introduction, in which the control is effected by a mode signal which depends not only on the storing of the data itself in to the buffer, but also on the mode signal used in the preceding instant, as well as on additional external control signals, whereby the variable input data flow is adapted to the output data flow with performances very constant over time.

According to a feature of the invention, the mode signal is no longer generated from a relationship substantially based upon the buffer filling degree, but from relations which depend upon the "past history" of the buffer filling.

In a preferred embodiment of the invention, the mode is obtained dynamically from the hysteresis curve of the filling degree.

In another embodiment of the invention, the control unit, which generates the running mode of the variable source at a certain instant, is now controlled, not only by the buffer filling degree, but also by external control signals, and by the mode used in a preceding instant.

Referring to FIG. 3, the circuit to embody the above mentioned system, which includes (as in prior art systems) a variable data source S (1), a BUFFER (3), and control unit UC (6), controlled by the buffer and operating on the variable data source by means of a register RE (7), advantageously also includes a complex control unit UC' (9), that incorporates an additional element ED (10), that is controlled by the output signal of register RE (7), which signal controls the mode at a fixed instant (t0), but is also fed back to the control unit (UC'), while that unit is generating the mode at the following instant (t1).

BRIEF DESCRIPTION OF THE DRAWING(S)

The features and advantages of the present invention will be better understood when the following description of the preferred embodiment is read in conjunction with the accompanying drawings, in which.

DETAILED DESCRIPTION OF THE PREFERRED EMBODIMENTS

Figure 1:
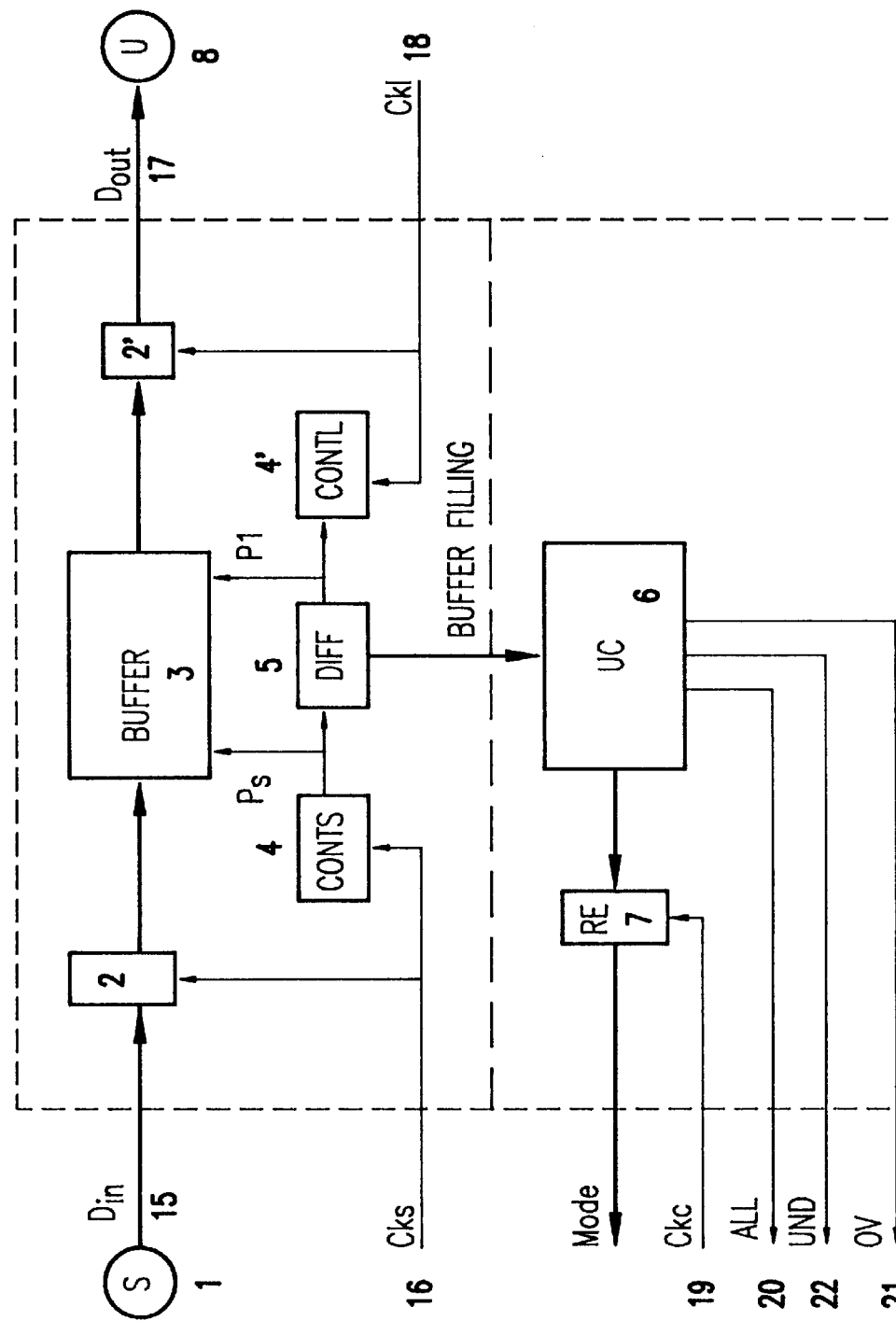
FIG. 1, shows a typical prior art control system.
Figure 2:
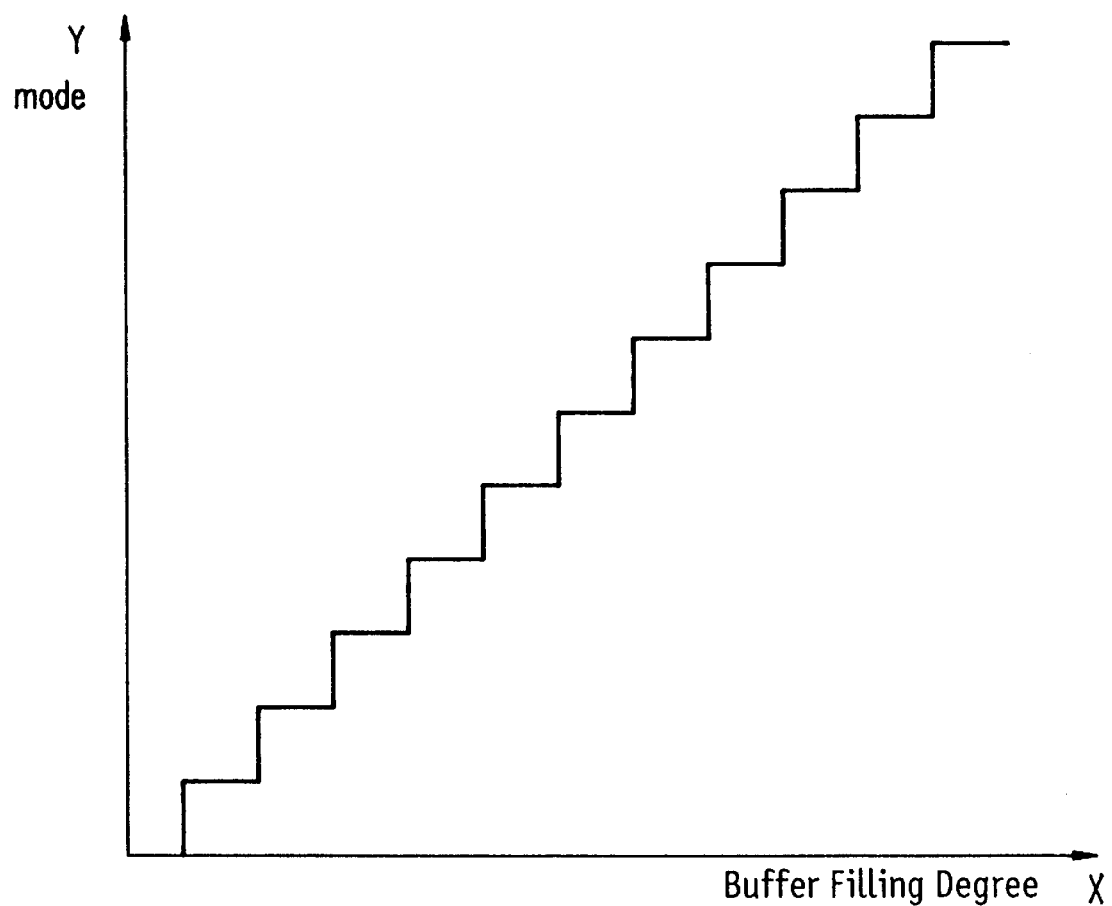
FIG. 2, shows the relationship between the degree of buffer filling and the operating mode in a prior art control system.
Figure 3:
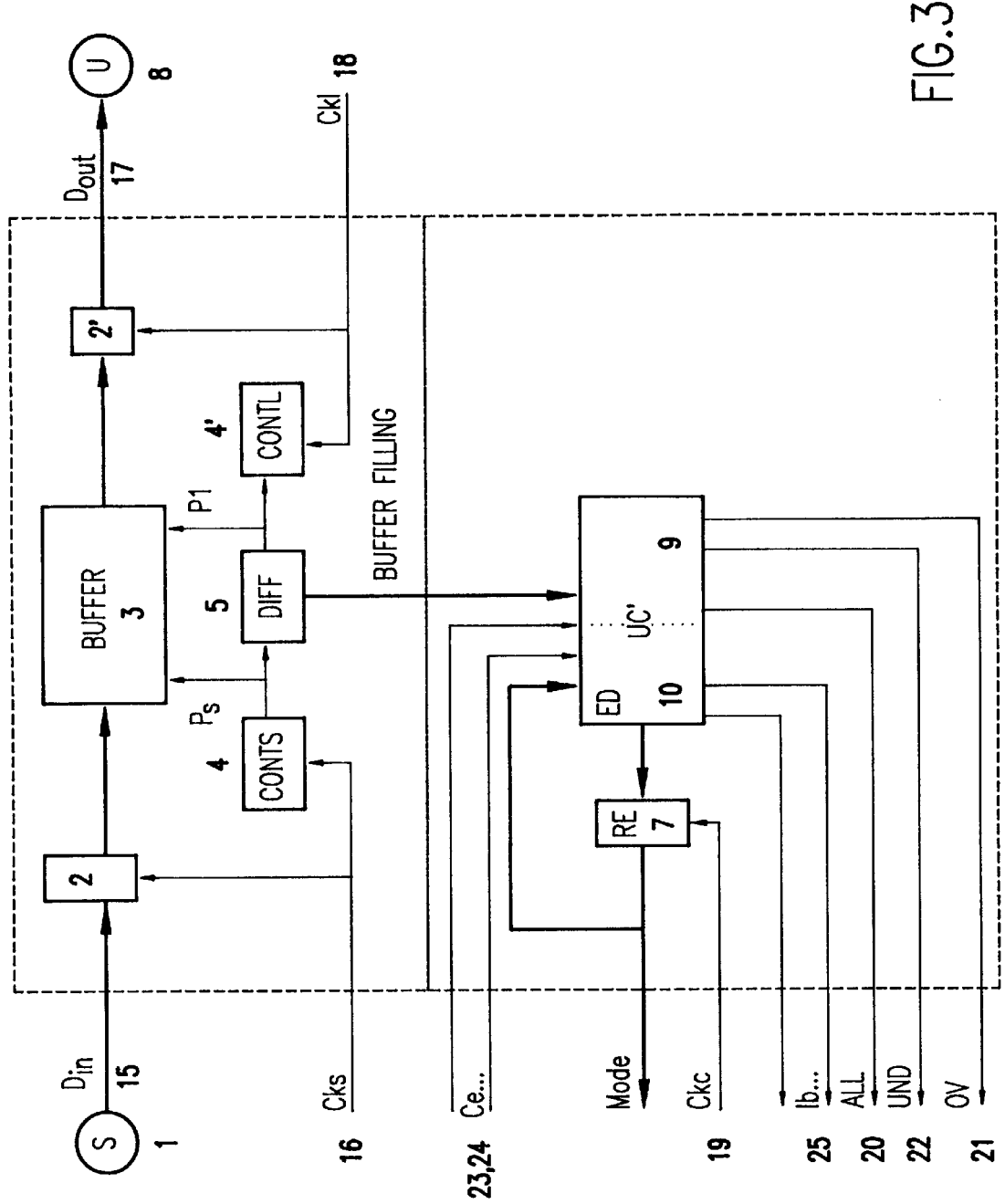
FIG. 3 shows the preferred control system of the present invention.

Referring now to FIG. 3, in accordance with a primary feature of the invention, the control unit UC' includes an additional portion or element ED (10), that is controlled by the mode signal obtained from the register RE (7) at the present instant (t0) and it is applied to UC', while UC' is generating the mode at the next instant (t1).

Figure 4:
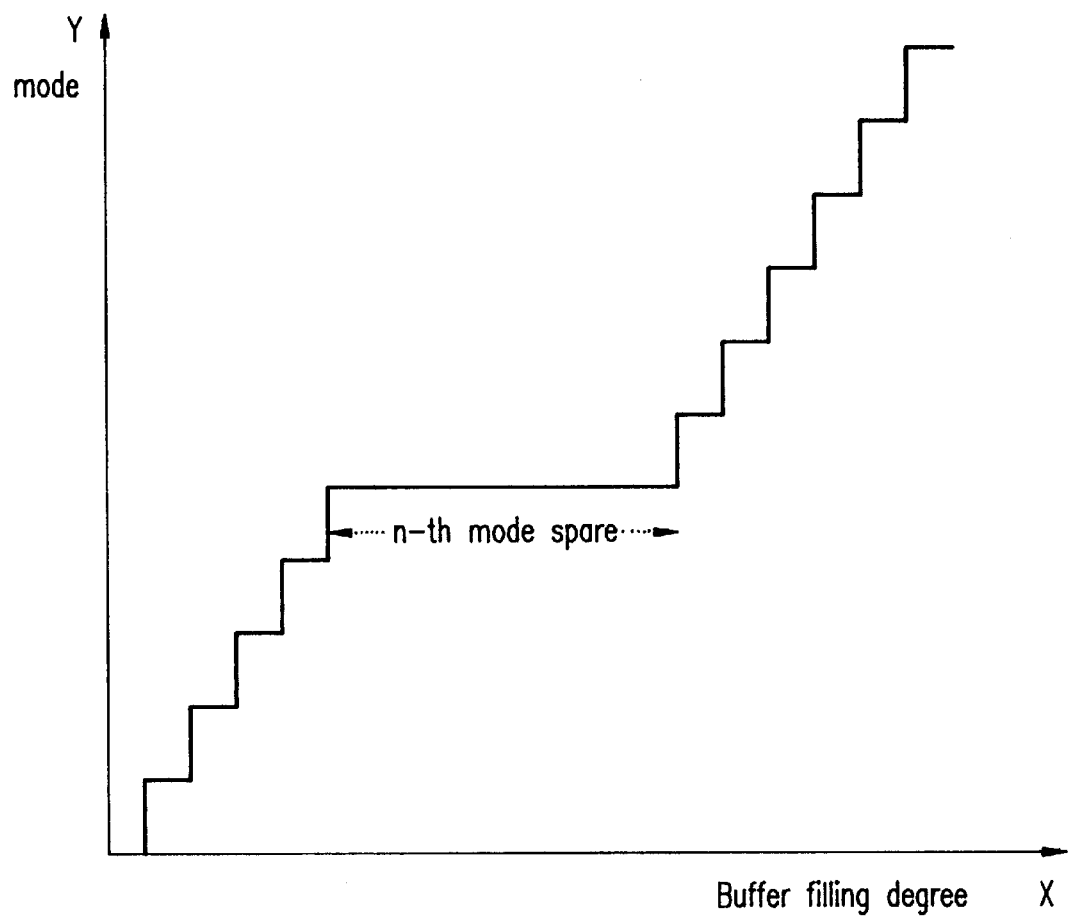
FIGS. 4–6 represent several possible relationships between the buffer filling and the operating mode in the system of the present invention.
Figure 5:
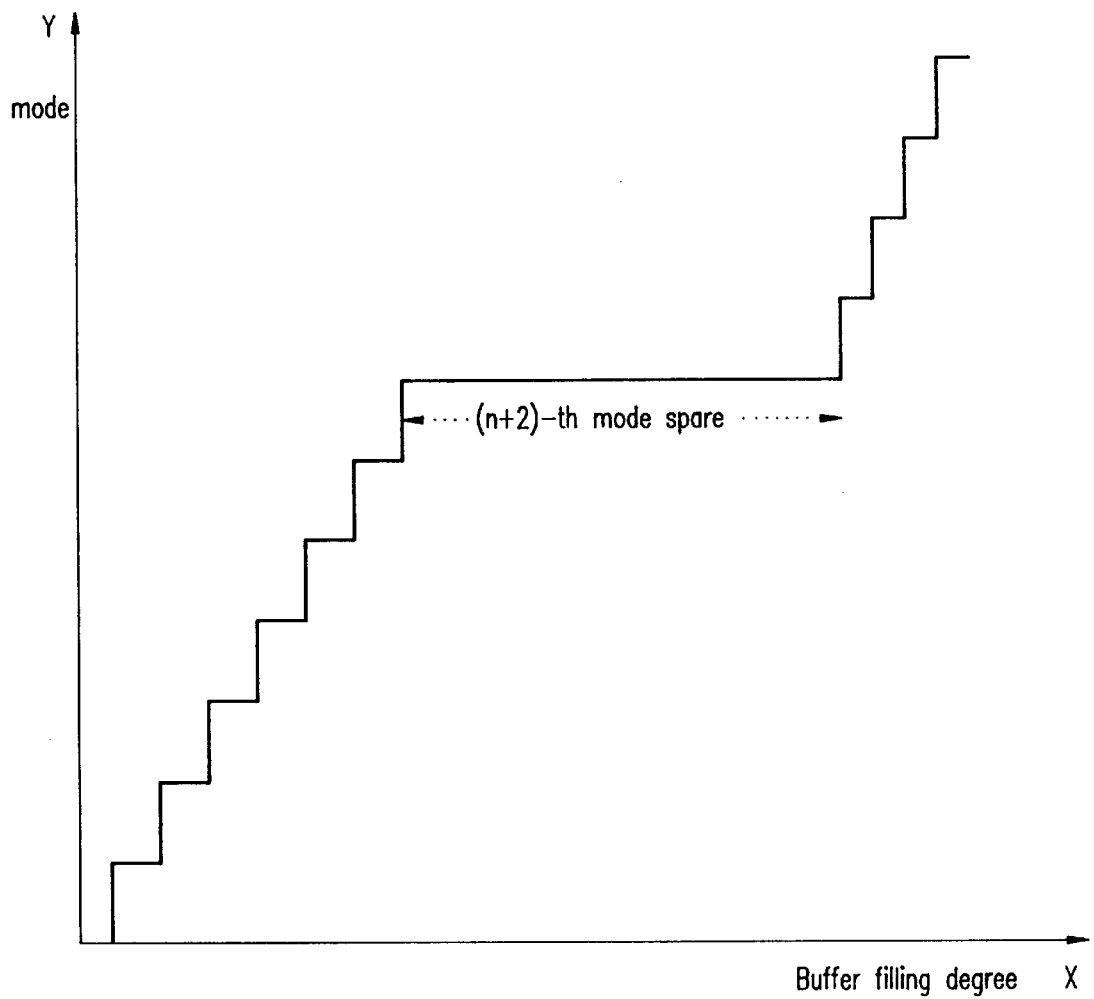
Figure 6:
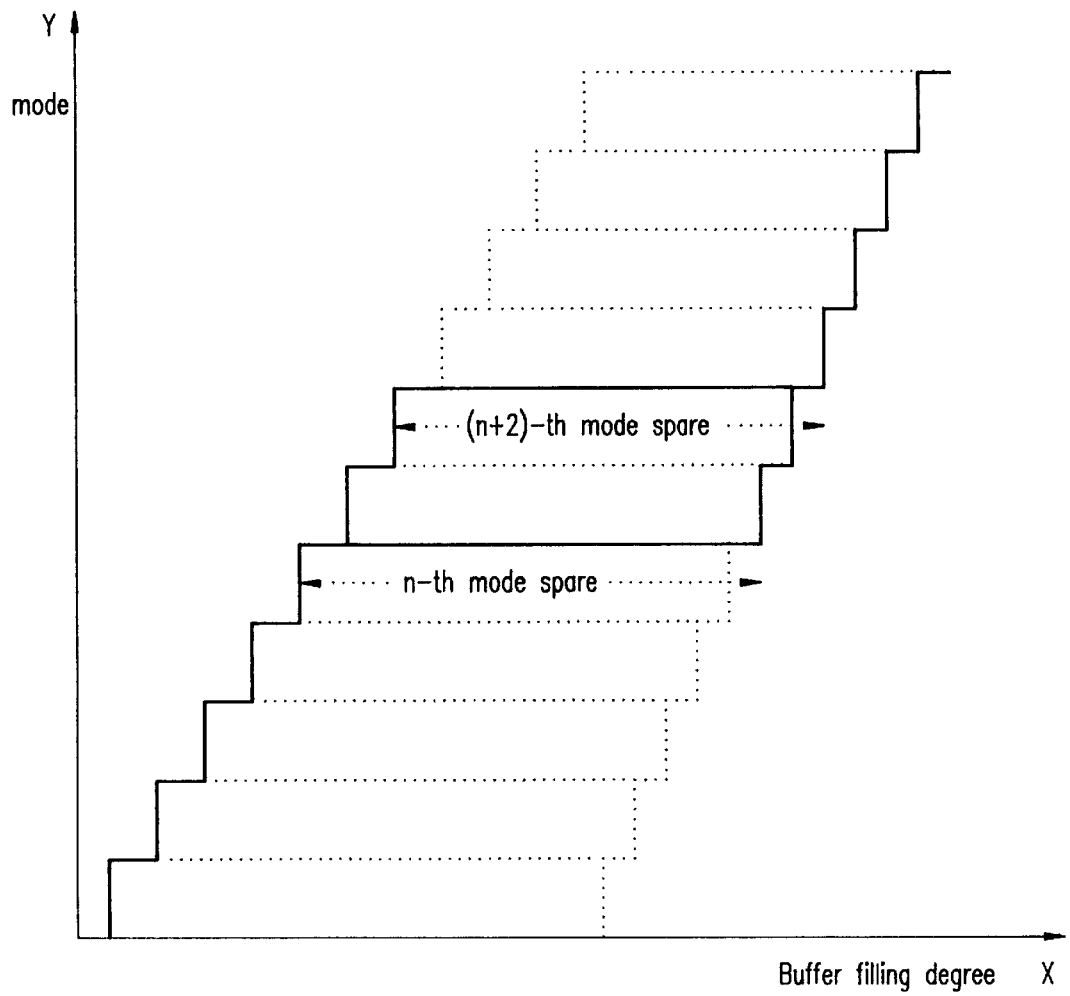

FIGS. 4, 5 and 6 show possible relationships between the buffer filling degree and the operating mode. This relation is obtained by having the "actual" mode retroacting on the control unit, obtaining in this manner a kind of hysteresis. In fact, with the present invention, there is no set relation between the mode and the buffer status, but instead a new dynamic relation is obtained which is based on the "past" condition.

Further, the invention is adapted to receive external control signals Ce (23, 24), that can change the selection parameters of the mode, for example, the function of the statistic source characteristics (it is possible, e.g. to assign different dimensions to the "spare" areas for each mode).

Further, the invention outputs a signal Ib (25) to the source to provide, for example, information related to the buffer status that cannot be obtained directly from the mode information.

The advantages obtained with this new type of buffer control are that the same running mode can be maintained over a longer time as compared to well-known methods, resulting in an increase of the quantity of transmitted data.

As an example, the "mode" generated by the present invention can be utilized advantageously to control the quantization of discrete cosine transform (DCT) coefficients in a video coder. The higher the mode value (sometimes referred to as the "transmission factor"), the smaller the quantity of data transmitted, and the lower the reconstructed video signal quality. It is therefore important to keep the mode as constant as possible, in order to avoid annoying visual effects on the reconstructed video signal.

As stated previously, the present invention accomplishes this objective by the provision of a control unit UC' which includes an additional input ED (10) that is controlled by the output signal of register RE (7), which signal controls the mode at a fixed instant ($t_o$), and in addition is fed back to the control unit (UC'), and is used by the control unit UC' to generate the mode at the following instant ($t_1$). The hysteresis effect resulting from the feedback of the control signal to the control unit is shown in FIG. 6, and in the following FIGS. 7–13.

Figure 7:
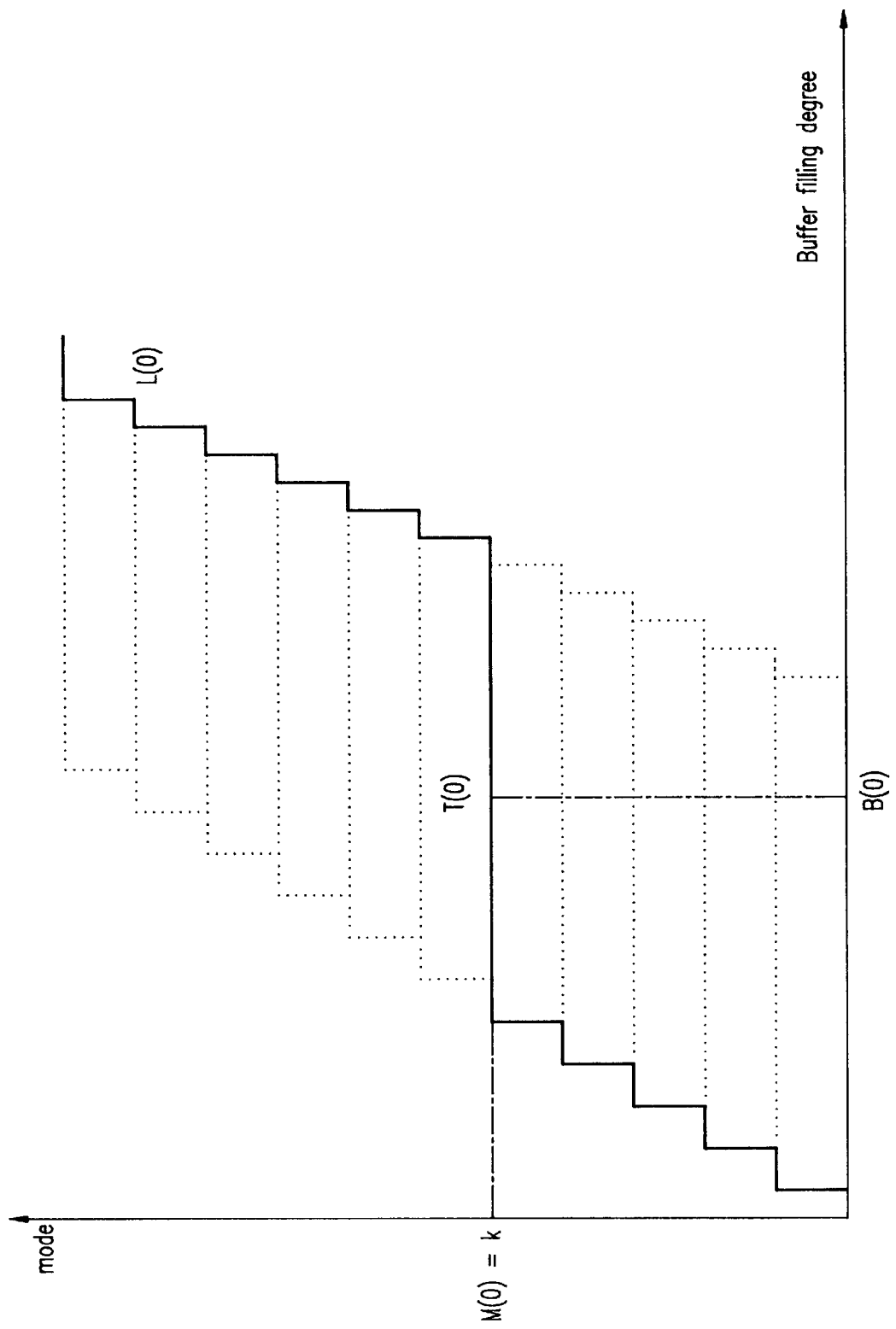
FIGS. 7–11 show how the control unit UC' of the present invention uses the buffer filling degree and the previous mode to generate the next mode.

FIG. 7 illustrates the buffer filling degree at the first instant in time T(0) in which the control unit UC' generates the mode M(0) having the value k and establishes the relationship L(0) between the buffer filling degree and the mode, i.e., the relationship to be utilized at the subsequent time T(1).

Figure 8:
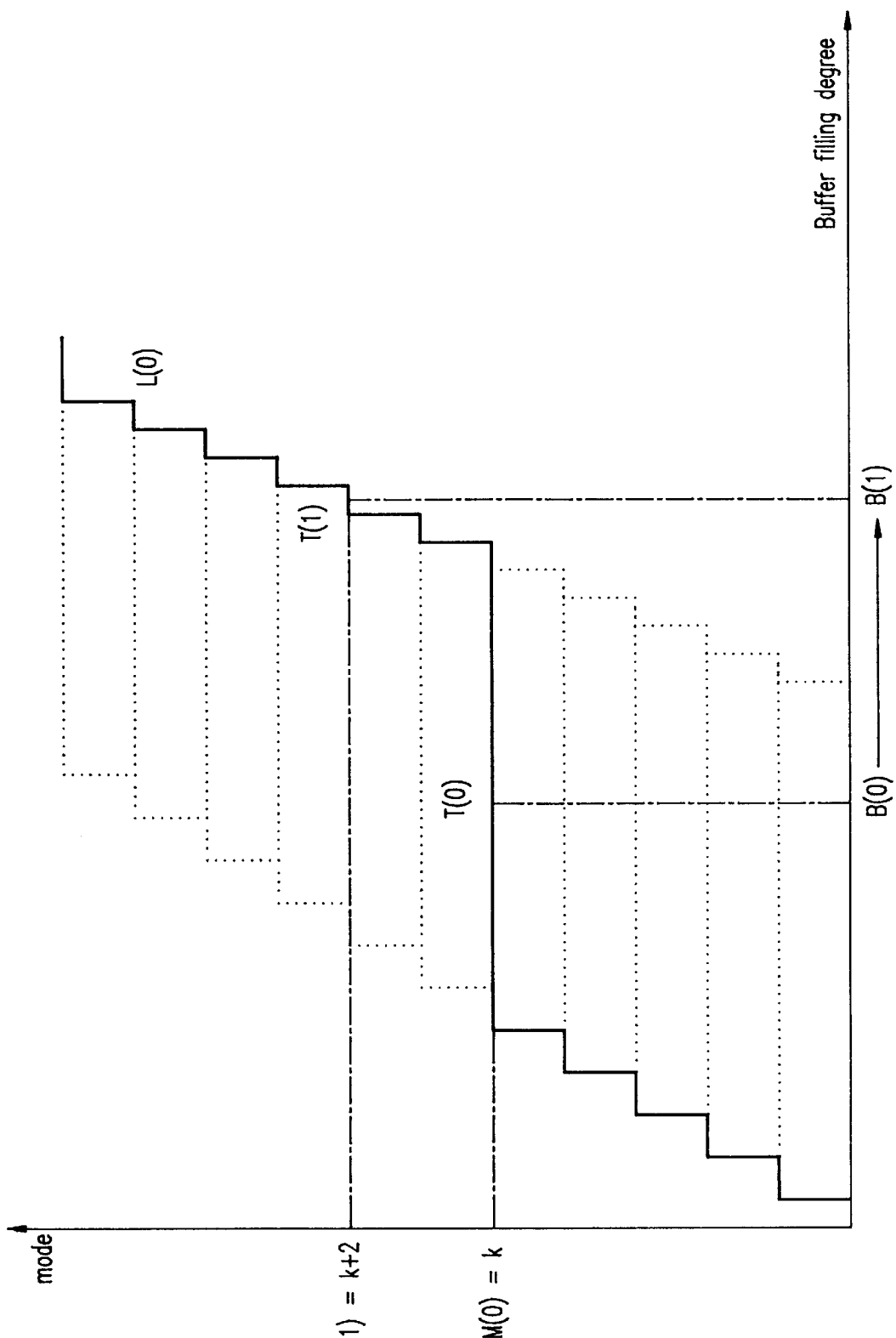

FIG. 8, at time T(1), shows that the control unit UC' uses the relationship L(0) and the buffer filling degree B(1) to generate the successive mode M(1) having the value k+2, and establishes the relationship L(1) to be utilized at subsequent time T(2).

Figure 9:
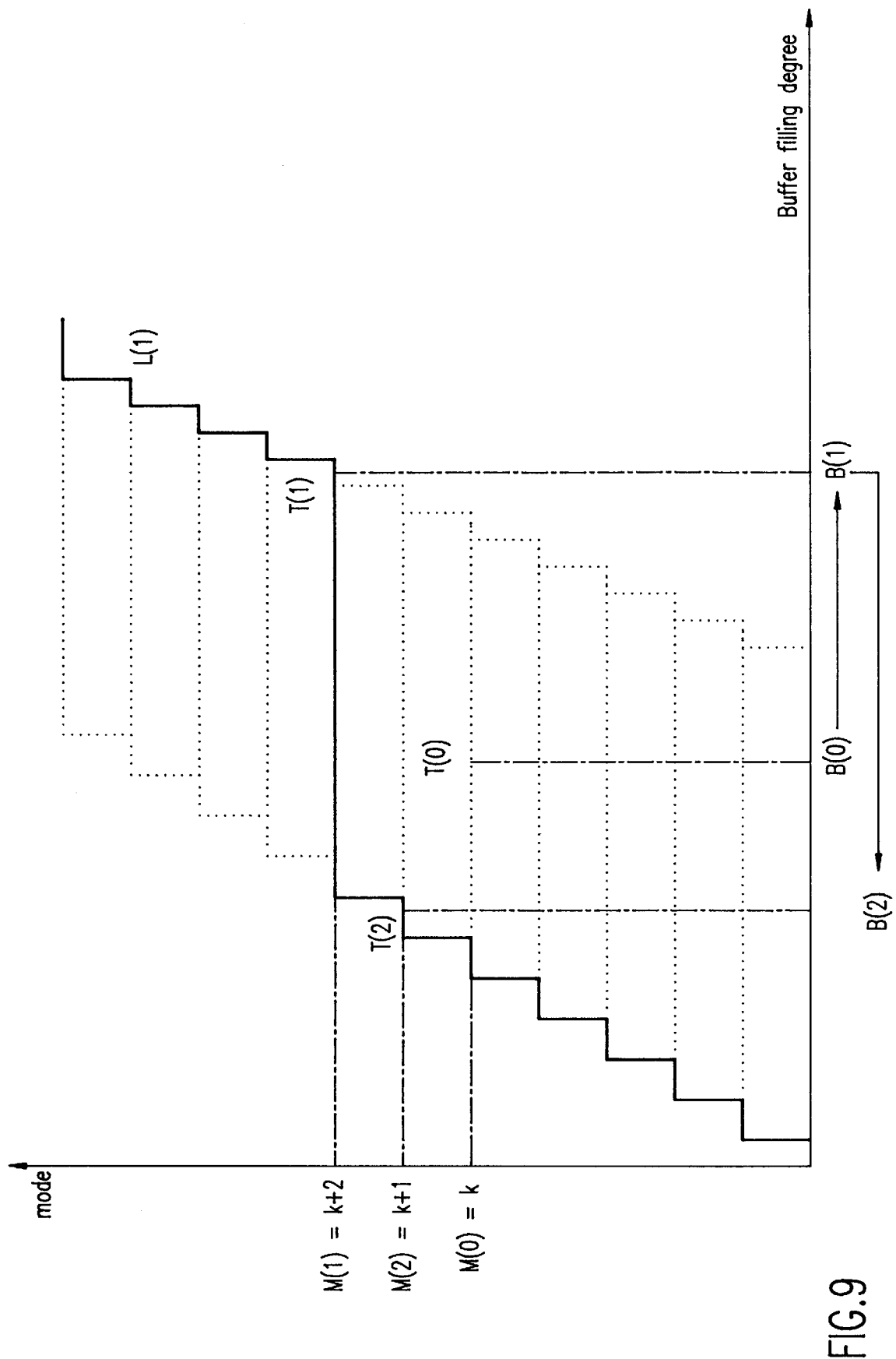

FIG. 9, at time T(2), shows how the control unit UC' uses the relationship L(1) and the buffer filling degree B(2) to generate the next mode M(2) having the value k+1 and to establish the relationship L(2) to be utilized at time T(3).

Figure 10:
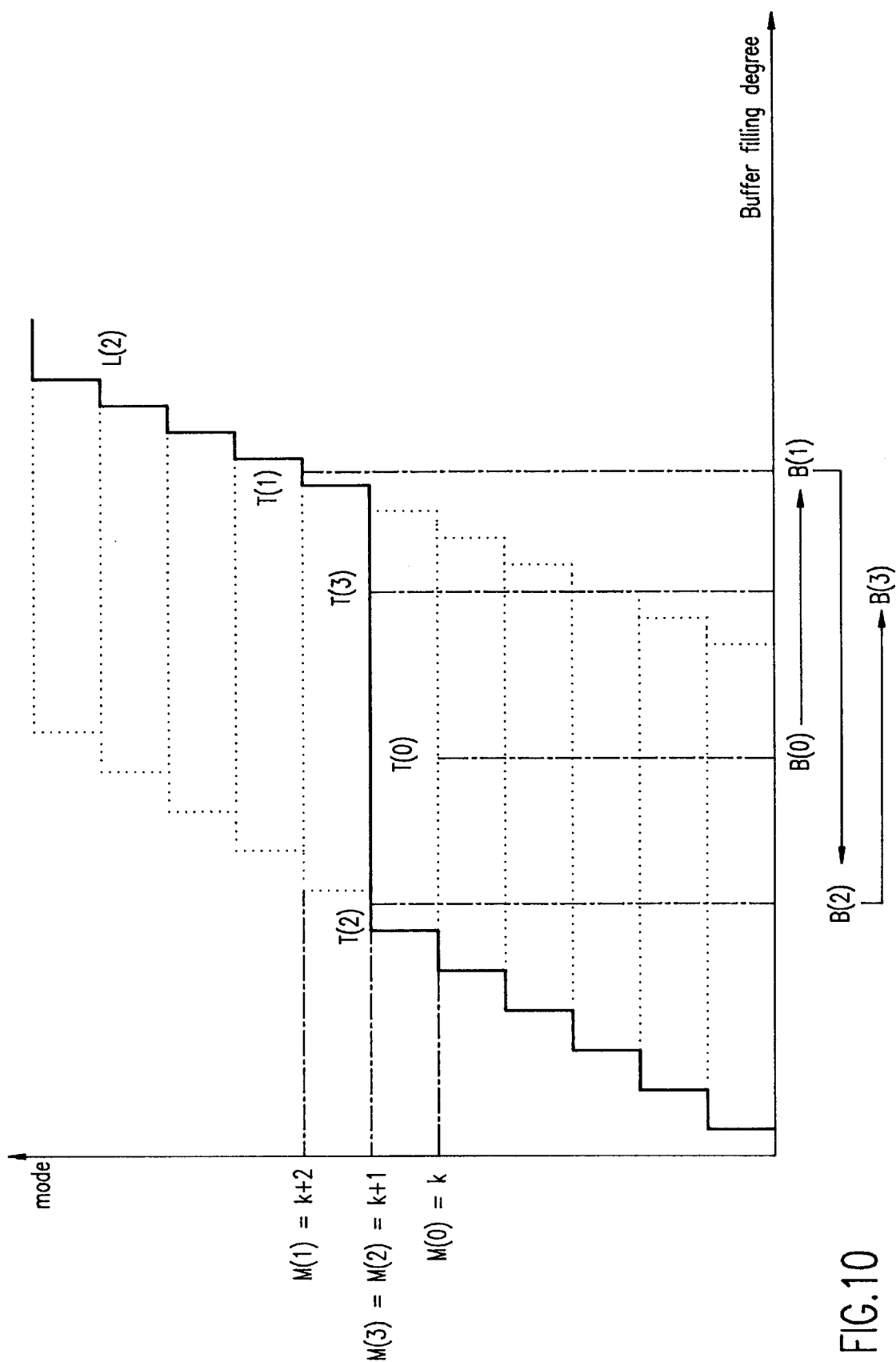

FIG. 10 shows the same behavior at time T(3) using L(2) and B(3) to generate M(3) having a value k+1 and to establish L(3) for upcoming time T(4).

Figure 11:
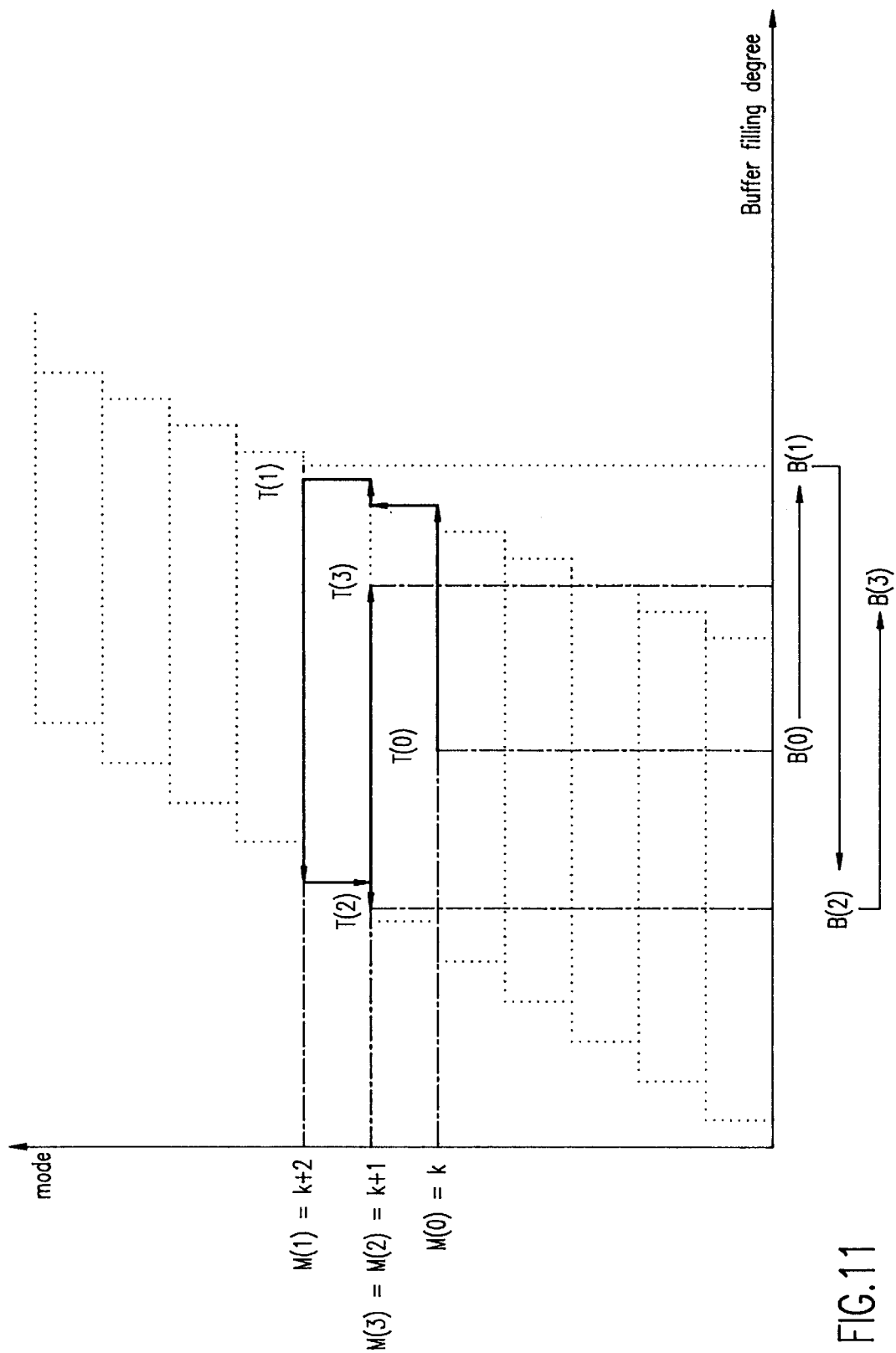

The process continues with FIG. 11, showing a summary of the path followed by the control unit UC'.

Figure 12:
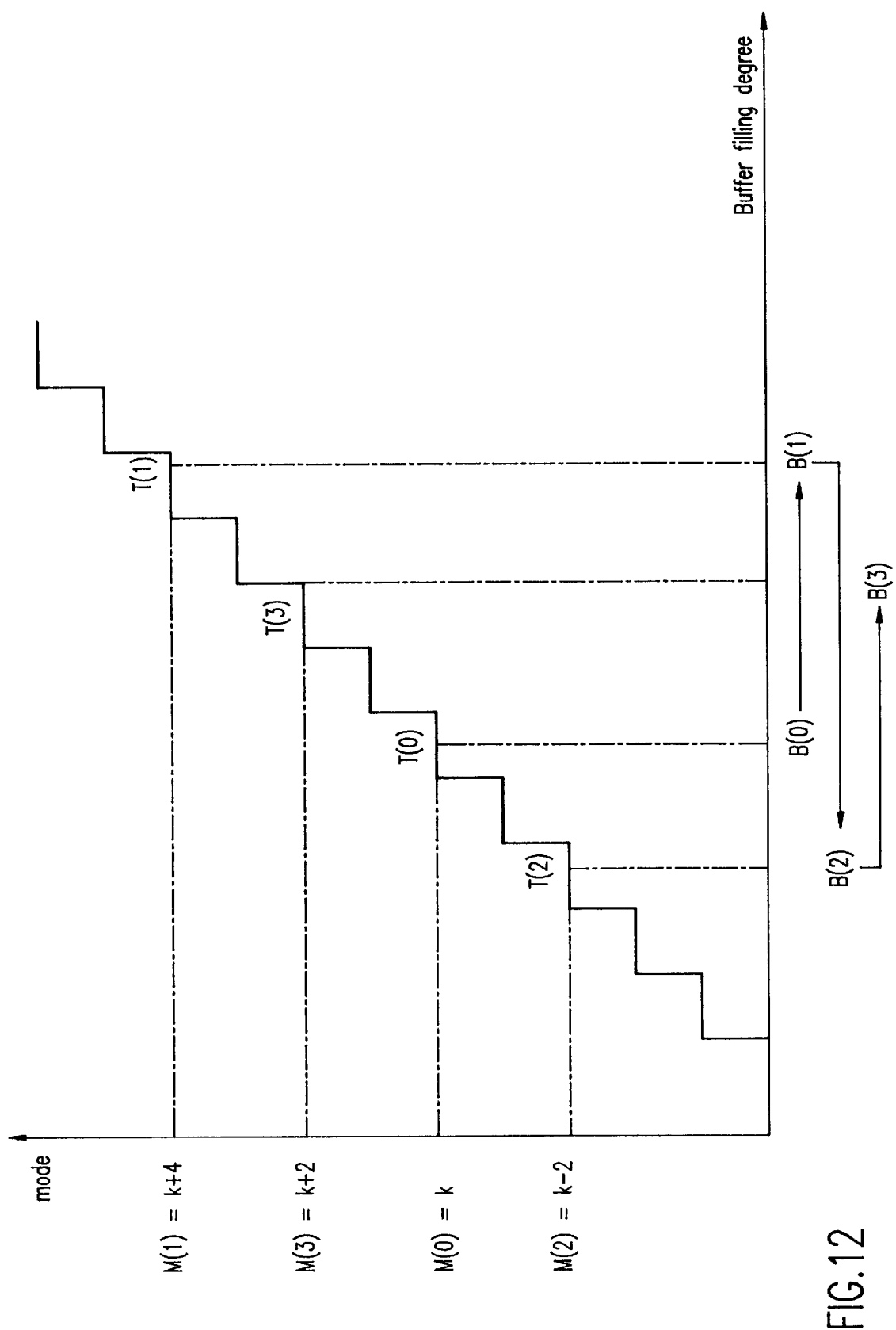
FIG. 12 shows how a conventional control unit UC generates the operating mode.

FIG. 12 shows how a conventional control unit UC generates an operating mode starting from M(0)=k and a buffer filling degree of B(0), B(1), B(2), B(3), etc.

Figure 13:
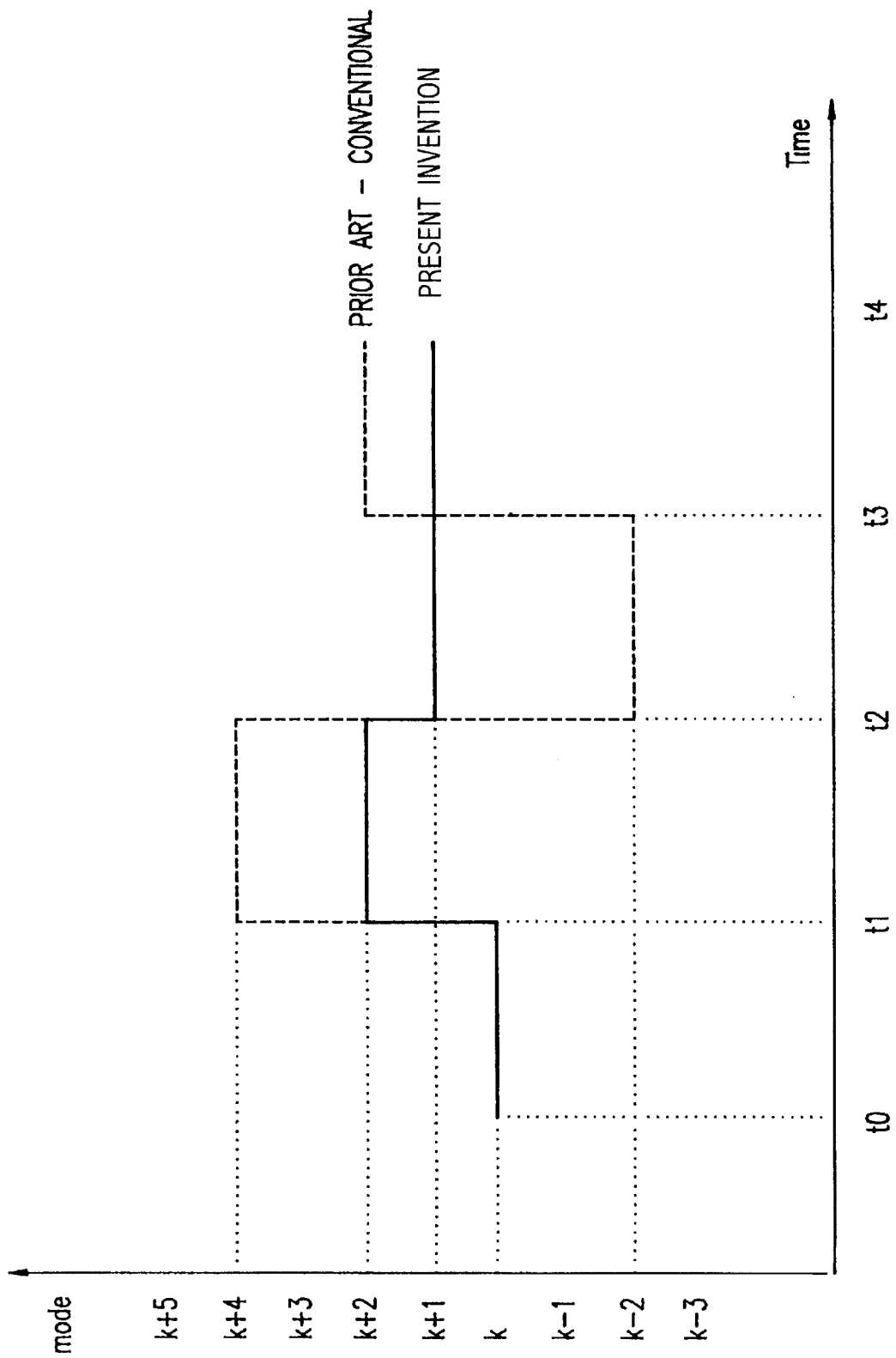
FIG. 13 shows the variation over time of the mode values using a conventional control unit US versus the control unit UC' of the present invention.

FIG. 13 illustrates a comparison over time between generating the mode values by using feedback (in accordance with the present invention), i.e., with knowledge of the preceding mode, versus generating the mode values without feedback (in accordance with the prior art). As is evident from FIG. 13, the present invention advantageously produces significantly less variation in modes than conventional systems without feedback.

Turning now to the structure of the control unit UC', reference is made to European Transmission Standard (ETS) 300174, entitled "Network Aspects—Digital coding of component television signals for contribution quality applications in the range 34–45 Mbit/s," published by the European Telecommunications Standards Institute, ETSI Secretariat: B.P. 152. F-06561 Valbonne, Cedex, France (1991). The standard set forth in this publication is as follows:

buffer size=1,572,864 bits (1.5 Mbit)
buffer minimum occupation=131,072 bits (128 Kbit)
buffer maximum occupation=1,441,792 bits (1.5 Mbit)
transmission factor=0:175 (running mode)

Figure 14:
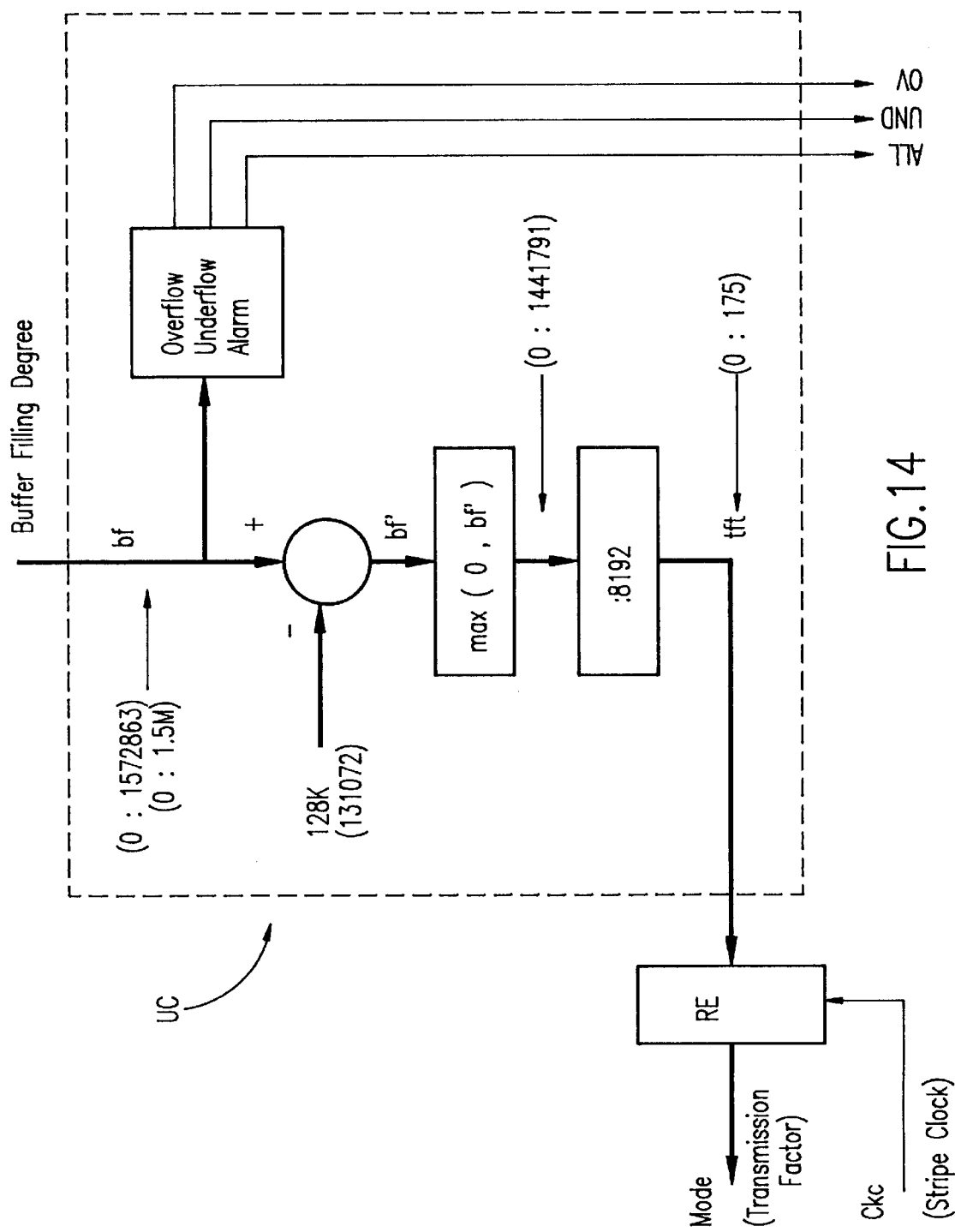
FIG. 14 shows the structure of a conventional control unit UC.

The structure of a conventional control unit UC following the above standard is shown in FIG. 14. The signal tft is sampled at a stripe frequency (Ckc) and is the result of a simple operation on the buffer (bf) filling degree. The sampled signal tft establishes the mode (transmission factor tf) to be utilized in the successive stripe to control the source.

Figure 15:
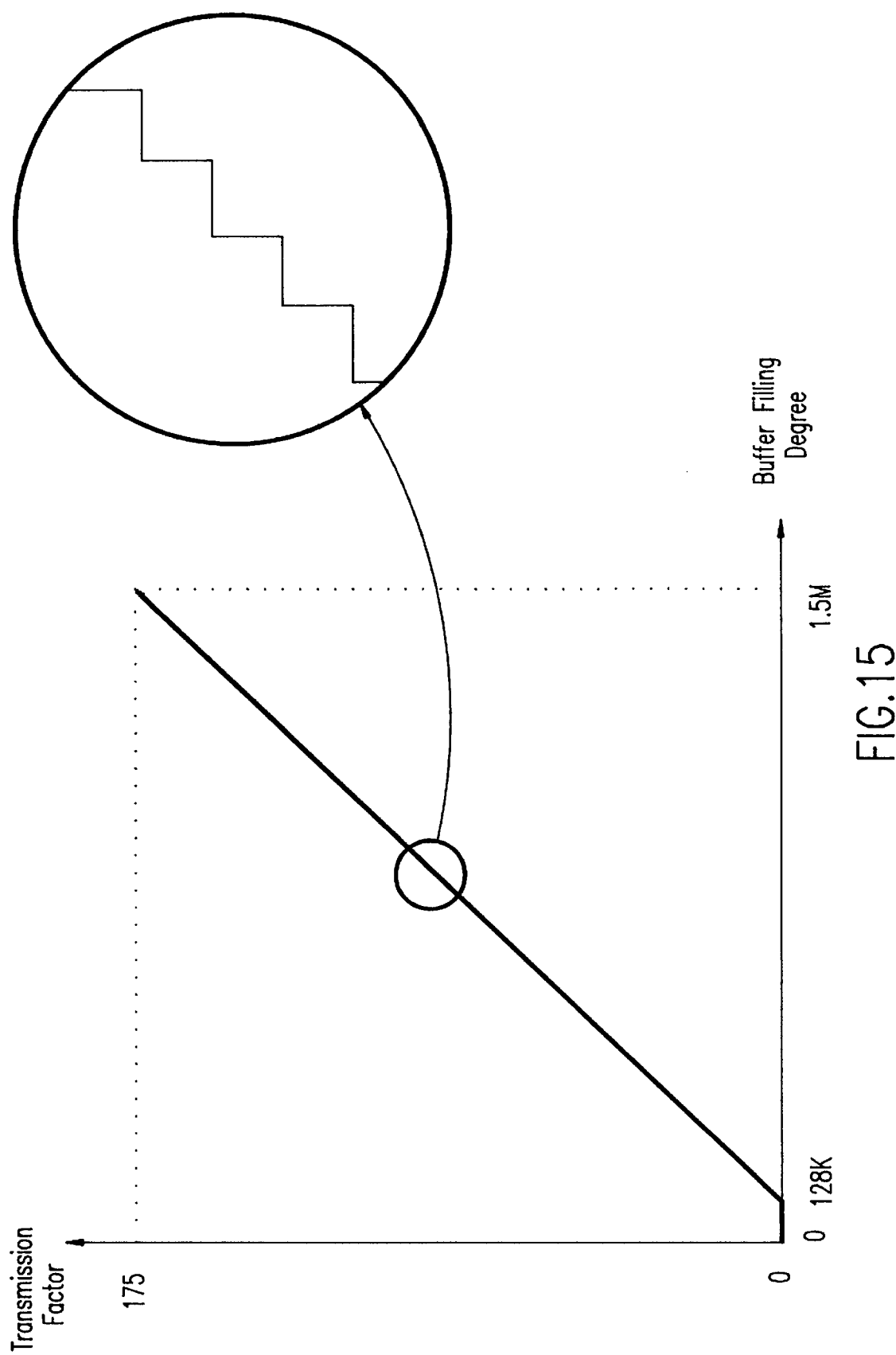
FIG. 15 shows the relationship between buffer filling degrees and transmission factor (mode) for a conventional control unit UC.

The relationship between buffer occupation and transmission factor to be utilized in the successive stripe is shown in FIG. 15.

Figure 16:
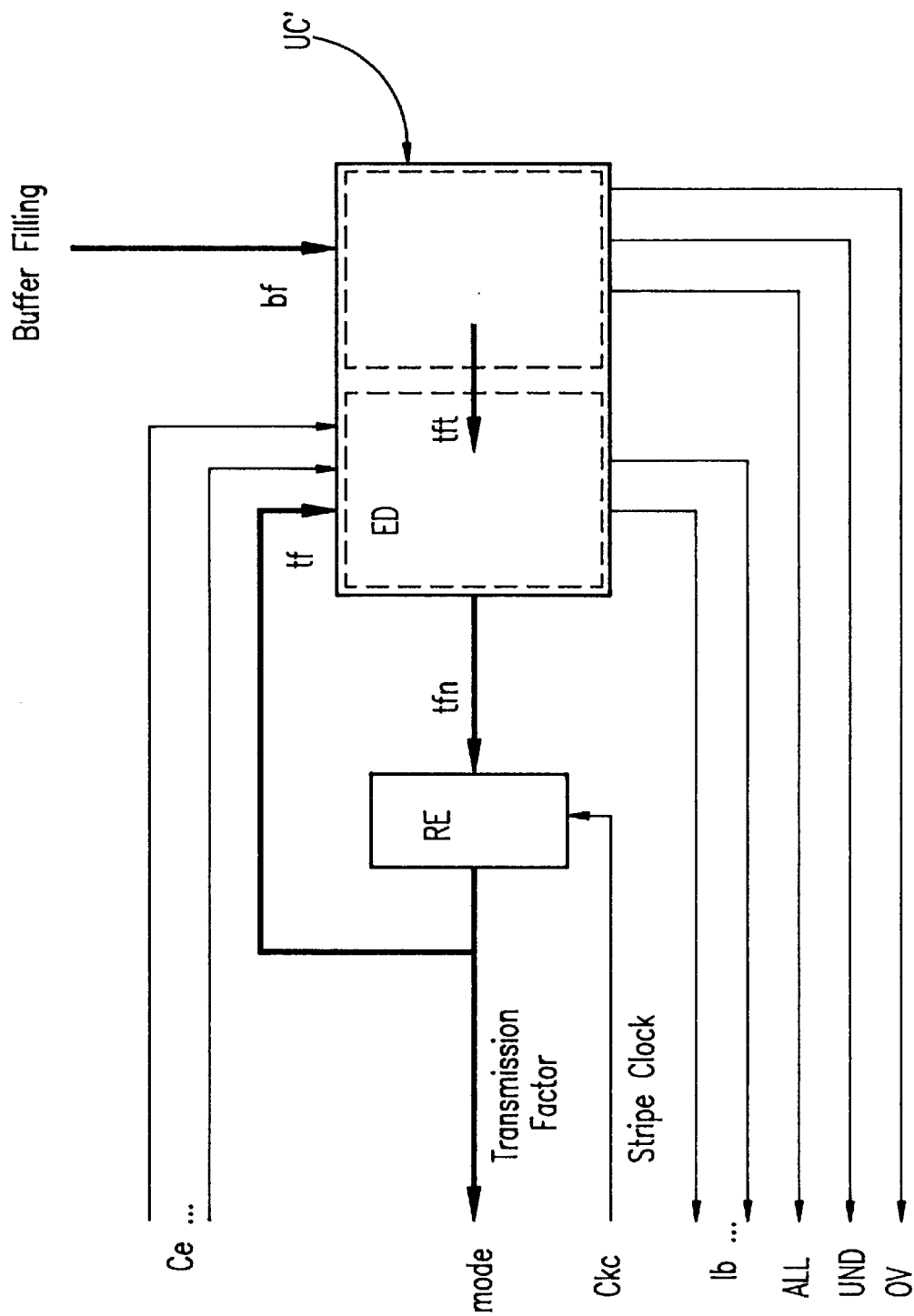
FIG. 16 shows a circuit ED added to a conventional control unit UC to form the control unit UC' of the present invention.

With reference now to FIG. 16, a circuit ED is added to the conventional control unit UC to form the control unit UC' of the present invention.

Figure 17:
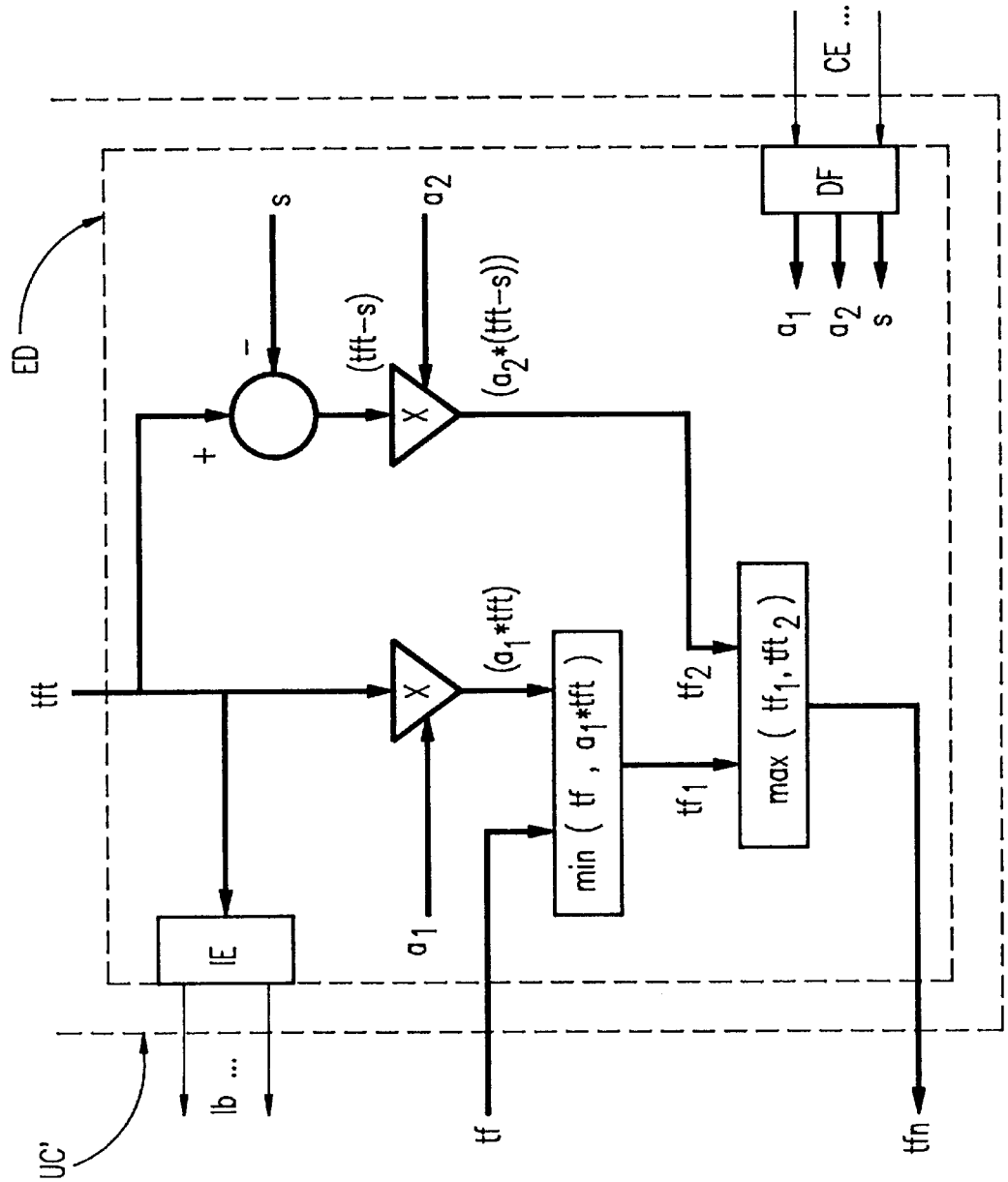
FIG. 17 shows the structure of the control unit UC' of the present invention.

FIG. 17 shows, in block diagram form, the preferred structure of circuit ED. As is evident from FIG. 17, circuit ED utilizes the mode (transmission factor tf) to control the source S in the preceding time (preceding stripe) and the buffer filling degree (bf) (through tft) to generate the mode (transmission factor tf) to be utilized to regulate the source S in the successive time (successive stripe). In FIG. 17:

tfn is the maximum value between $tf_1$ and $tf_2$;

$tf_2$ is the product $a_2(tft-s)$;

$tf_1$ is the minimum between tf and the product $a_1(tft)$;

$a_1$, $a_2$ and s can be counted or established, for example, by external controls (Ce).

It can be advisable in some instances to extract information on the buffer filling degree (Ib, output from block IE) for other types of control of the source S.

Figure 18:
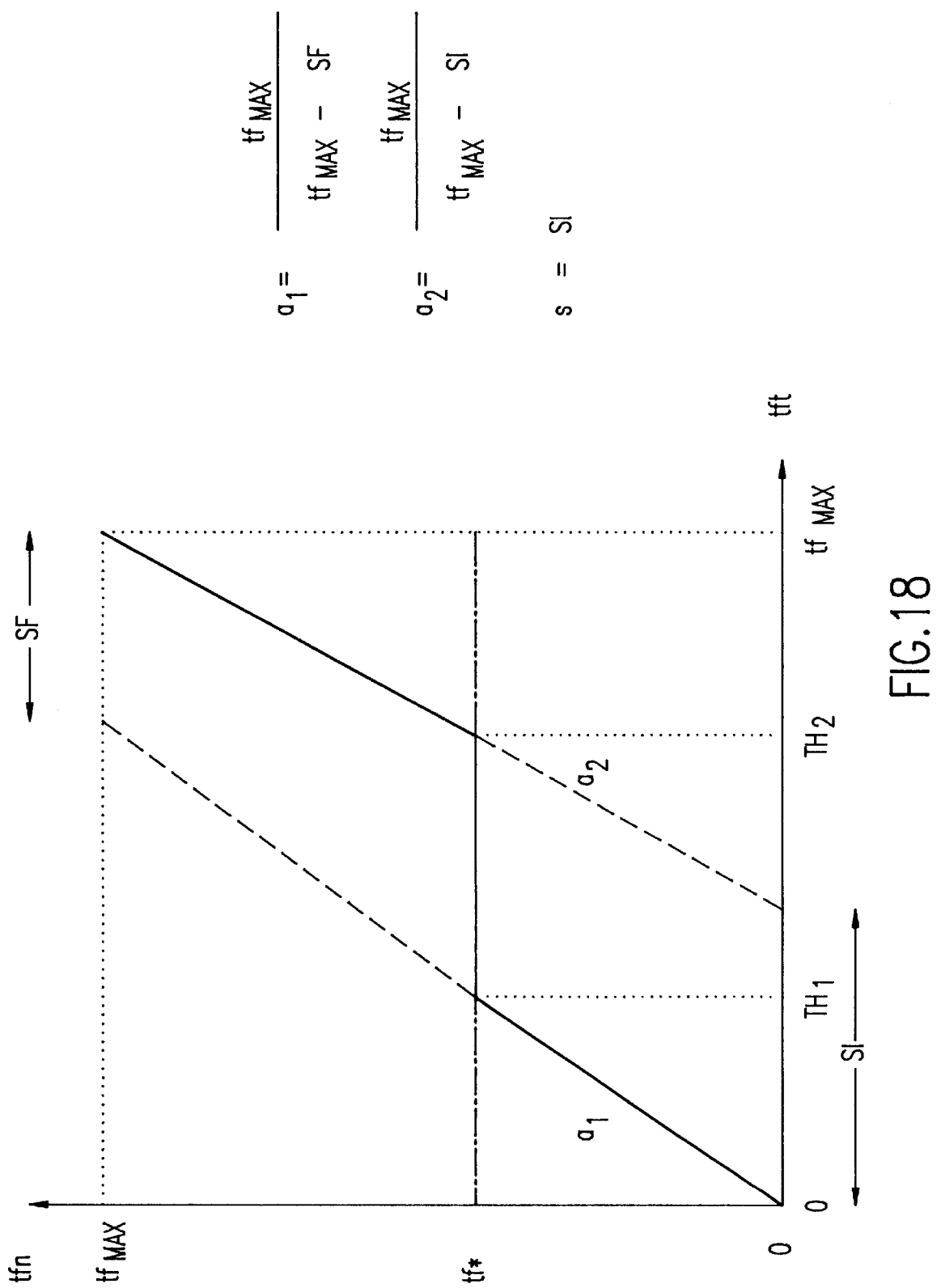
FIG. 18 shows the geometrical meaning of parameters $a_1$, $a_2$ and s.

Referring to FIG. 18, two constants SI and SF are selected by considering the statistics of the source (S), the frequency (Ck1) with which the data are taken out from the buffer and the mode sampling period (Ckc). SI represents the capability to absorb the buffer filling degree variations when tf=0. SF represents the capability to absorb variations of the buffer filling degree when $tf=tf_{max}$.

With reference to FIG. 18, $a_1$, $a_2$, and s are then calculated with the geometric relations as shown. As is evident from FIG. 18:

the variations of bf which maintain tft between Th1 and Th2 (thresholds which depend on tf*, i.e., the mode used to regulate the source in the preceding stripe) do not lead to modifications of tf for the successive stripe (tfn=tf*);

the variation of bf which leads tft below $Th_1$ generates a tf for the successive stripe lower than tf* (tfn=$a_1$ * tft<tf*).

Figure 19:
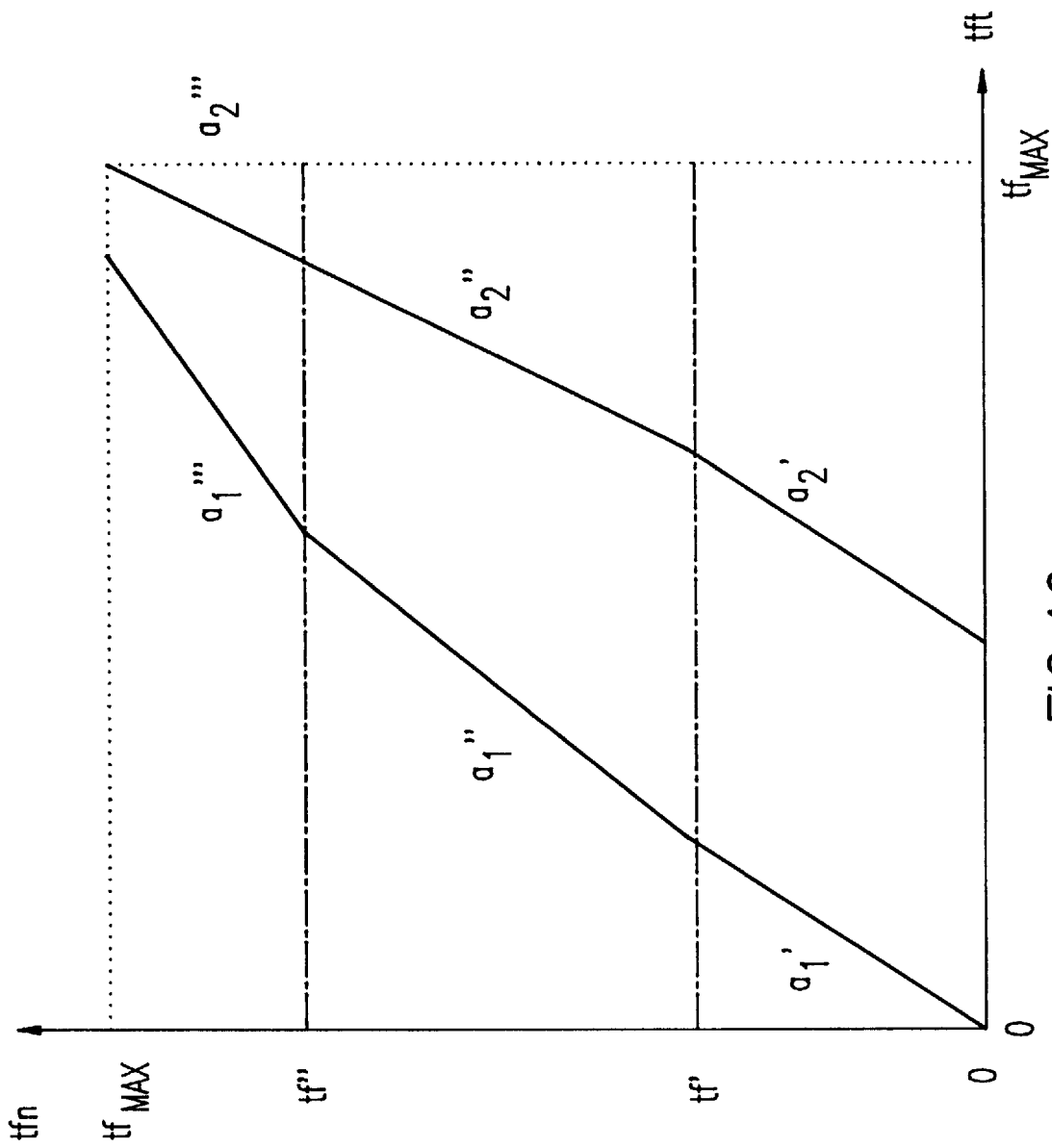
FIG. 19 is a modification of FIG. 18 in which the factors $a_1$, $a_2$ an s are made dependent on the previous mode.

It should be noted that $a_1$, $a_2$, and s can also (optionally) be made dependent (i.e., variable) upon the mode utilized to regulate the source in the preceding stripe, as shown in FIG. 19.

Figure 20:
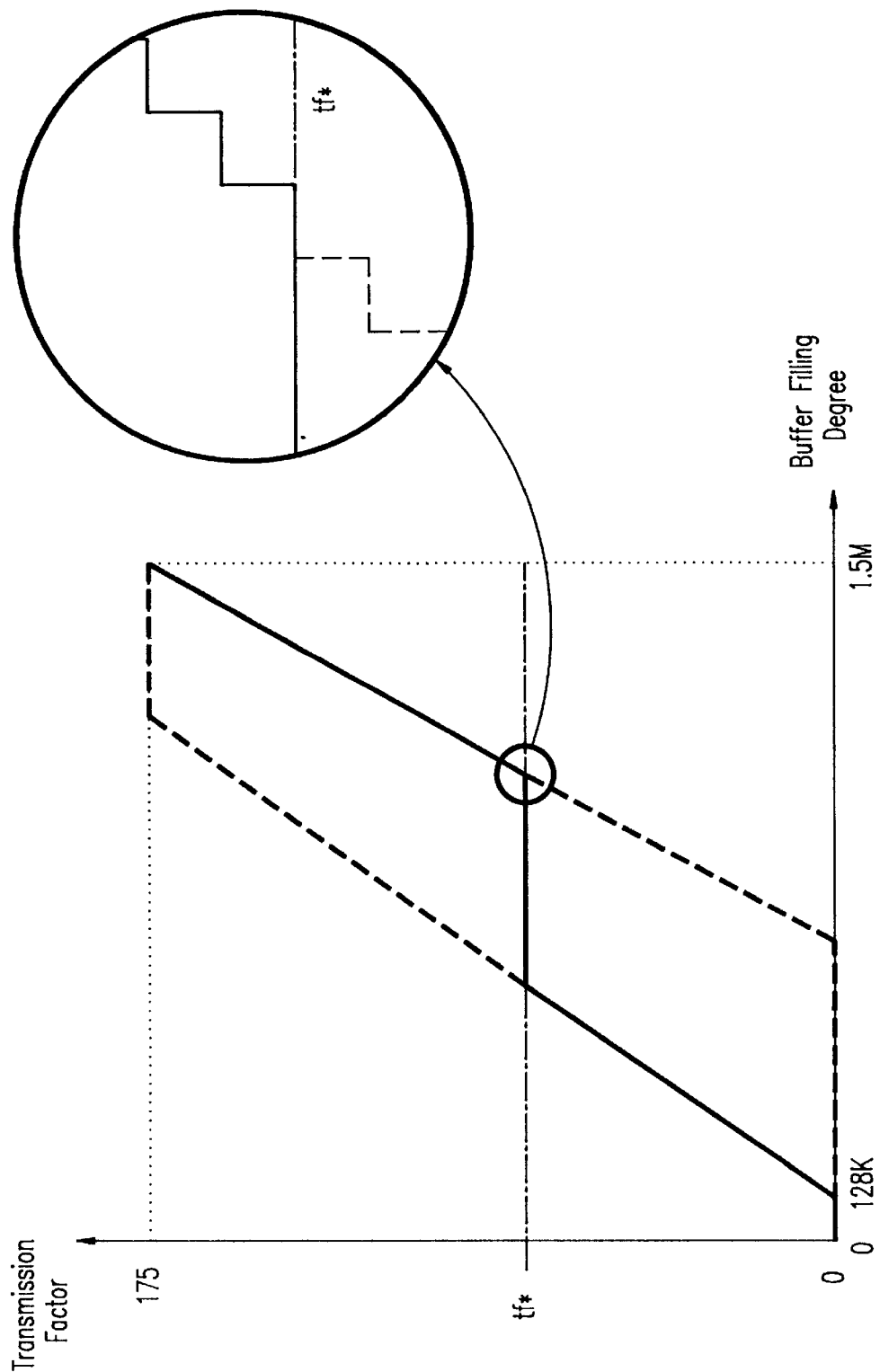
FIG. 20 shows the relation between buffer filling degree and mode using the control unit UC' of the present invention.

FIG. 20 shows the relation between the buffer filling degree (bf) and a particular mode (tf*), the dashed line representing the envelope of the buffer filling degree depending upon the mode utilized in the preceding stripe.

It should be noted that the control unit UC' of the present invention can be implemented in a simple manner if ROMs are used to carry out the complex relationships, such as those represented in FIG. 19.

Obviously, the invention has been described for clarity's sake with reference to the drawings and examples, but it is not limited to these embodiments, as it is susceptible of changes and modifications and replacements which, being within the reach of the person ordinarily skilled in the art, fall naturally within the spirit and scope of the invention.

What is claimed is:

1. A method for controlling the rate of flow of data from a variable rate data source having a number of changes of the rate of flow of data to a buffer which transmits said data at a constant rate, said method comprising the steps of:

generating an operating mode in a control unit for controlling the rate of flow of data from said variable rate data source to said buffer, said operating mode being based upon the degree to which said buffer is filled and a previous operating mode having been generated to control the previous rate of flow of data from said variable rate data source;

transmitting said operating mode from said control unit to said variable rate data source to control the rate of flow of data from said variable rate data source; and feeding said operating mode back to said control unit as said previous operating mode for generating a subsequent operating mode, whereby generating said subsequent operating mode based upon said previous operating mode results in an hysteresis effect, thereby reducing the number of changes of the rate of flow of data from said variable rate data source, wherein said step of feeding said operating mode back to said control unit as said previous operating mode for generating a subsequent operating mode comprises the following sub-steps:

taking the minimum between said operating mode, multiplied by a first constant, and said previous operating mode;

subtracting a third constant from said operating mode; and taking the maximum between said minimum and the product of said subtraction and a second constant, said maximum being said subsequent operating mode.

2. A method as recited in claim 1, wherein said previous operating mode used is the immediately preceding operating mode.

3. A method as recited in claim 1, wherein said operating mode is based upon the degree of filling of the buffer and said previous operating mode, and also upon external control signals which alter said hysteresis effect.

4. The method of claim 3, wherein said external control signals comprise a spare area having a dimension for each operating mode level such that said operating mode is not changed based on the previous operating mode when the operating mode level is within the respective spare area.

5. A method as recited in claim 1, further comprising the step of outputting a signal representing the degree to which said buffer is filled.

6. The method of claim 1, wherein the rate of flow of data from said variable rate data source comprises the generation frequency of the source.

7. The method of claim 1, wherein the operating mode is generated such that the buffer is prevented from being filled.

8. The method of claim 1, wherein the operating mode is generated such that loss of data flowing from the variable rate data source to the buffer is prevented.

9. The method of claim 1, wherein said operating mode varies by digital increments, and generating of said operating mode results in a difference between selected, subsequent operating modes of more than one increment.

10. A circuit for controlling the rate of flow of data, the circuit comprising:

a variable rate data source for providing a flow of data having a number of changes of the rate of flow of data;

a buffer for receiving data from said variable rate data source and transmitting said data at a constant rate; and a control unit for controlling said variable rate data source, the control unit receiving a signal from said buffer indicating the degree to which said buffer is full, and a previous operating mode signal from said control unit, and outputting an operating mode signal to said variable rate data source, said operating mode signal being fed back to said control unit and used by said control unit to generate a subsequent operating mode signal for controlling a subsequent rate of flow of data from said variable rate data source resulting in an hysteresis effect, thereby reducing the number of changes of the rate of flow of data from said variable rate data source, wherein said control unit for controlling said variable rate data source further comprises:

means for calculating the minimum between said operating mode, multiplied by a first constant, and said previous operating mode;

means for subtracting a third constant from said operating mode, and for multiplying the result by a second constant; and means for calculating the maximum between the outputs of said means for calculating the minimum and said means for subtracting and multiplying, to obtain said subsequent operating mode.

11. A circuit as recited in claim 10, wherein said control unit is adapted to receive external signals for changing said hysteresis effect.

* * * * *